Figure 1:
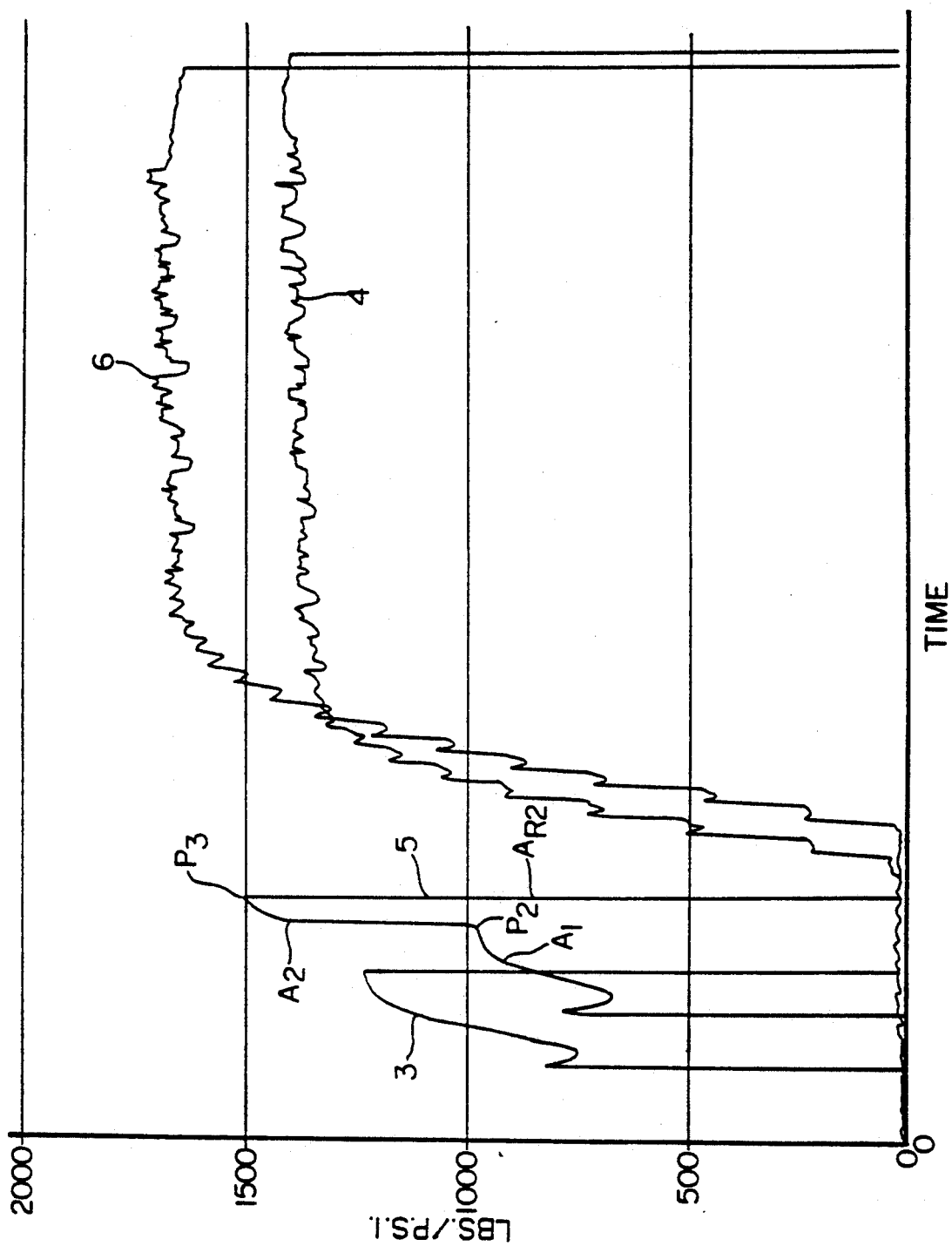

United States Patent [19]

Brainard

[11] Patent Number: 5,281,007
[45] Date of Patent: Jan. 25, 1994

[54] HYDRAULIC ACTUATION SYSTEM FOR HYDRAULICALLY POWERED PARKING BRAKES

[75] Inventor: Dale E. Brainard, South Bend, Ind.
[73] Assignee: Allied-Signal Inc., Morristown, N.J.
[21] Appl. No.: 933,280
[22] Filed: Aug. 21, 1992
[51] Int. Cl.⁵ .............................................. B60T 13/00
[52] U.S. Cl. ........................................ 303/71; 303/3; 303/15
[58] Field of Search ................... 303/10, 11, 15, 3, 20, 303/85

[56] References Cited

U.S. PATENT DOCUMENTS 5,161,862  11/1992  Kunz et al. .......................... 303/11
5,165,763  11/1992  Matsuda ................................ 303/11

FOREIGN PATENT DOCUMENTS 727495   4/1980  U.S.S.R. ................................. 303/11
1527051  12/1989  U.S.S.R. ................................. 303/11

Primary Examiner—Matthew C. Graham
Attorney, Agent, or Firm—Larry J. Palguta; Ken C. Decker

[57] ABSTRACT

The hydraulic actuation system (10) utilizes efficiently stored hydraulic pressure to effect a higher final pressure in the system (10) for a parking brake application. The system includes a pump (12) which communicates separately with accumulators or pressure storage mechanisms (20, 30) isolated from one another. A first accumulator (20) communicates with a first three-position apply and release valve mechanism (40) that can communicate via an apply hydraulic line (26) with a second two-position apply valve mechanism (50). The second accumulator (30) communicates with the second apply valve mechanism (50). The second apply valve mechanism (50) communicates the apply hydraulic line (26) with apply lines (55, 63, 73) and at least one brake (60, 70) that is hydraulically actuated for a parking brake application. The brake (60, 70) includes a release hydraulic line (62, 72, 49) which communicates with the first apply and release valve mechanism (40). Activation of the first apply and release valve mechanism (40) to an apply position (41) communicates the first apply and release valve mechanism (40) with the second apply valve mechanism (50) and brake (60, 70) via the apply hydraulic lines (26, 55, 63, 73), while the release hydraulic line (62, 72, 49) is communicated with reservoir (18), to effect an initial phase of the hydraulically actuated parking application.

16 Claims, 2 Drawing Sheets

HYDRAULIC ACTUATION SYSTEM FOR HYDRAULICALLY POWERED PARKING BRAKES

The present invention relates generally to an actuation system for hydraulically powered brakes, and in particular to a two-phase system for effecting a higher pressure within the system and increased parking load by the brakes.

BACKGROUND OF THE INVENTION

Powered parking brake systems may utilize stored energy to apply the brakes upon command from a vehicle operator. These parking brake systems may be electrically or mechanically actuated. A majority of powered parking brake systems utilize a compressed coil spring as the energy source. This spring is usually held in the energized state by a pressurized piston. Another energy source is a charged hydraulic accumulator wherein hydraulic fluid stored under pressure is utilized for a parking brake application. When applying the parking brake, the fluid is used to move a piston which applies the parking load, either directly or indirectly. This may be an integral component of the service brake system or a separate parking assembly. When a hydraulic accumulator is employed, the final pressure applied is dependent upon the initial accumulator pressure, the stiffness of the braking system, and the volumetric capacity of the accumulator. The operating clearances and lightly loaded segments of the brake system consume the initial delivered volume at the highest pressures of the accumulator. The accumulator pressure decreases as fluid displaces the piston until the hydraulic system is in balance with the mechanical load which is at a maximum at this point in time. If additional brake load is desired for the system, the general practice is to increase the volumetric capacity of the accumulator so that the discharged or delivered volume of the accumulator is a smaller percentage of the total, and thereby resulting in a higher final pressure and thus higher braking load when fluid flow ceases.

It is desirable to provide a hydraulic actuation system for hydraulically powered parking brakes such as disclosed is copending U.S. Ser. No. 07/704,586 now U.S. Pat. No. 5,161,650 entitled "Disc Brake with Powered Integral Parking Mechanism" and assigned to the same assignee as herein. It is desirable to provide a system which effects a higher resultant final system pressure and, therefore, a higher mechanical brake load than is typically achieved in a system. It is advantageous if the system can deliver a higher final pressure with the same initial volume of fluid displacement. Thus, the system would be more efficient.

SUMMARY OF THE INVENTION

The present invention provides solutions to the above problems by providing an actuation system for a hydraulically powered parking brake mechanism, the system comprising pump means having an inlet connected with reservoir means and an outlet for supplying fluid pressure to at least two pressure storage means, the two pressure storage means comprising first pressure storage means communicating with first apply and release valve means and second pressure storage means communicating with second apply valve means, the first apply and release valve means communicating with the second apply valve means, and at least one brake mechanism which is actuated hydraulically to effect a parking application, the brake mechanism connected with the apply and release valve means and with the apply valve means to effect said parking application, such that operation of the pump means effects the supply of fluid pressure to said first and second pressure storage means and, independently, an actuation of the first apply and release valve means communicates the first pressure storage means with the second apply valve means and brake mechanism to effect an initial phase of said parking application, and a deactivation of said first apply and release valve means and activation of the second apply valve means disconnects the first pressure storage means from communication with the brake mechanism and connects the second pressure storage means with the brake mechanism to effect a second phase of said parking application.

BRIEF DESCRIPTION OF THE INVENTION

Figure 2:
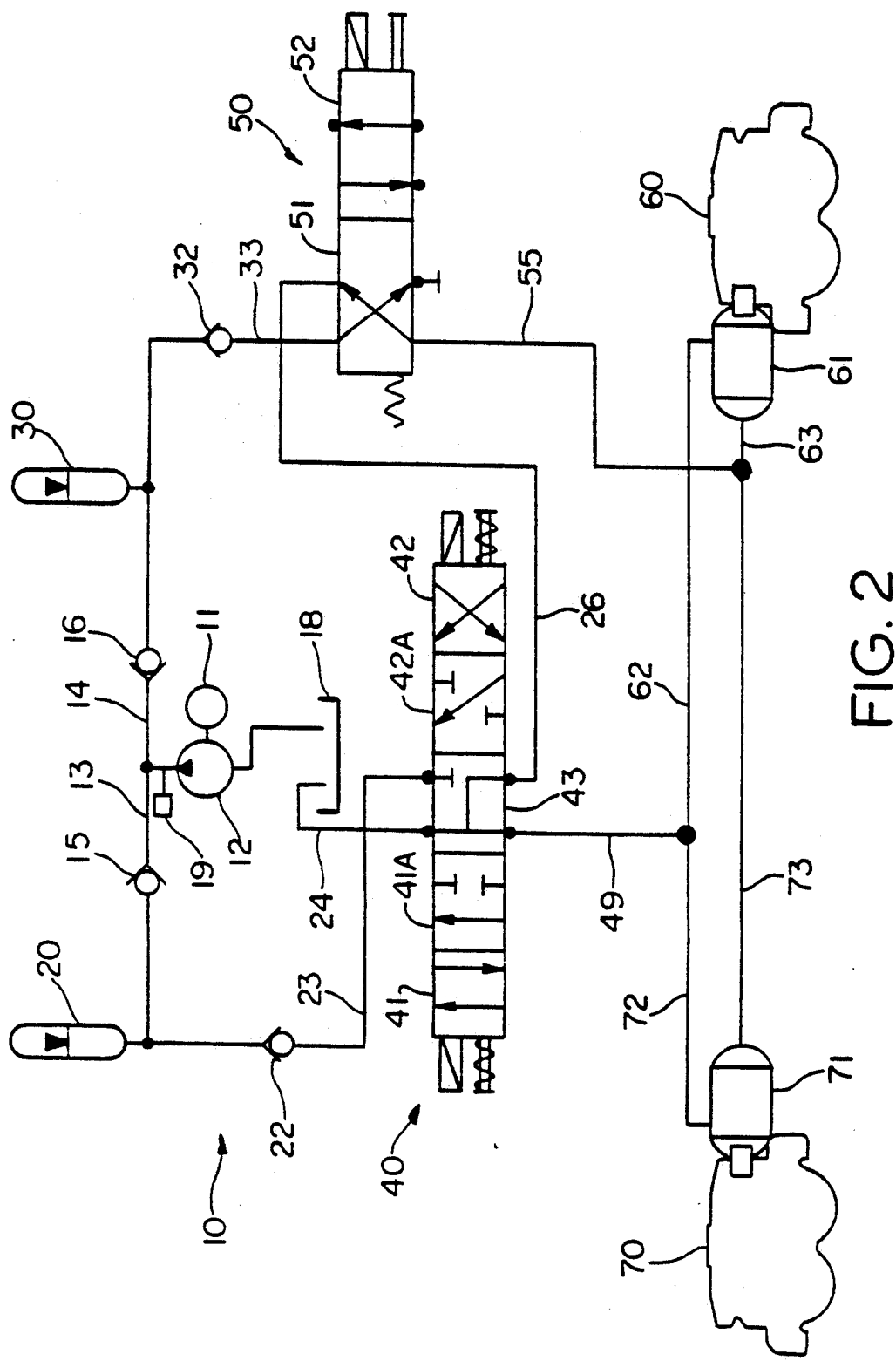

The invention is described in detail below with reference to the drawings which illustrate an embodiment in which:

FIG. 1 is an illustration of pressure output curves and brake load curves which correspond to single accumulator and dual accumulator hydraulic actuation systems; and FIG. 2 is a schematic illustration of the hydraulic actuation system of the present invention.

DESCRIPTION OF THE INVENTION

Referring to FIG. 1, curve 3 represents the pressure output curve of a single accumulator hydraulic actuation system for a hydraulically powered parking brake, and curve 4 is the corresponding torque arm load effected by the system. Curve 5 is the hydraulic pressure output curve of a two-accumulator hydraulic actuation system for hydraulically powered parking brakes, and curve 6 is the corresponding torque arm load curve for the two-accumulator system. Referring to curve 3, during the application cycle hydraulic pressure curve 3 has a typical "S" geometry which settles at a final pressure of approximately 1240 psi. The accompanying load represented by curve 4 illustrates a static load achievement of about 1400 pounds. For curves 5 and 6, the two-accumulator actuation system comprises two accumulators each of which contains half of the volume of the single accumulator of the first hydraulic actuation system. The accumulators act independently of each other although each is charged to the same pressure to which the single accumulator was charged. When the accumulators are independently and serially applied, a higher final pressure and consequently a higher final braking load is achieved. Referring to curve 5, the pressure curve has the signature "S" shape with the curve peaking at approximately 970 psi ("$P_2$") at the end of curved portion $A_1$. This is the result of the application of the first, half-volume accumulator. At this time the second half-volume accumulator is actuated as evidenced by the vertical curved portion $A_2$. The small "S" curved portion $A_2$ illustrates fluid flow under pressure, and finally the pressure release is indicated by $A_{R2}$. The final pressure $P_3$ for curve 5 is approximately 1500 psi or about 20% higher than the 1240 psi with the nonsequential accumulator system. The braking load (curve 6) achieved as a result of utilizing a sequential system is about 1675 pounds torque arm force, again approximately 20% higher than the load or force achieved by the single accumulator system illustrated by curve 4. The initial or first half-volume accumulator supplies the fluid volume required to take-up piston motion in the unloaded and lightly loaded state of the braking system. Once this has been accomplished, the second half-volume accumulator, at the same initial pressure, is applied to the system. The sequencing of the accumulators may be made by either mechanical or electro-mechanical means.

Referring to FIG. 2, the hydraulic actuation system is referenced generally by numeral 10. Motor 11 drives pump 12 which communicates separately by lines 13 and 14 with a first pressure storage means or accumulator 20 and a second pressure storage means or accumulator 30. Accumulators 20, 30 are isolated from one another by check valves 15 and 16. Pressure switch 19 is utilized in system 10 to effect an automatic recharge of accumulators 20 and 30 by motor pump 12. The inlet side of pump 12 is connected with reservoir 18. Accumulator or pressure storage means 20 communicates via check valve 22 and line 23 with first apply and release valve 40. Apply and release valve 40 communicates via line 24 with reservoir 18, and via apply hydraulic line 26 with second apply valve 50. Apply and release valve 40 comprises a three-position electrically operated solenoid valve which may be, alternatively, a mechanically actuated three-position valve. However, valve 40 is illustrated as an electrically applied valve which includes apply position 41, release position 42, at-rest or neutral position 43, apply transition position 41A, and release transition position 42A.

Second accumulator or pressure storage means 30 communicates via check valve 32 and line 33 with apply valve 50. Apply valve 50 comprises a two-position electrically operated apply valve which may, alternatively, be mechanically applied, but is illustrated as an electrically operated solenoid valve. Apply valve 50 communicates via apply position 51 with apply hydraulic line 55 that communicates with hydraulic application/release apparatus 61 of dual piston disc brake 60. Brake 60 may comprise the disc brake with powered integral parking mechanism as disclosed in copending U.S. Ser. No. 07/704,586, now U.S. Pat. No. 5,161,650 incorporated by reference herein. Hydraulic apparatus 61 includes hydraulic release line 62 which communicates via line 49 with first apply and release valve 40. The at-rest or neutral position 51 of second apply valve 50 connects apply hydraulic lines 26, 55 and terminates line 33 at termination 59 so that second pressure storage means or accumulator 30 does not communicate with any other parts of the system. Apply position 52 of apply valve 50 connects line 26 with termination 59 so that it does not communicate with any other part of the system while line 33, and thus accumulator 30, is connected directly to apply hydraulic lines 55, 63 and hydraulic application/release apparatus 61 for a parking operation of brake 60. System 10 includes similar or identical brake 70 with hydraulic application/release apparatus 71, and apply line 73.

During the operation of system 10, motor pump 12 charges accumulators 20 and 30 simultaneously through lines 13 and 14 so that the accumulators are charged to an initial desired pressure controlled by pressure switch 19, while remaining separated from one another via check valves 15 and 16. During a parking brake application cycle, apply and release valve 40 is energized by the vehicle operator via a not shown switch or other mechanism, so that apply position 41 is displaced to an activated position and connects line 23 with line 26 so that accumulator 20 communicates with second apply valve 50. At the same time, release lines 62 and 72 are communicated via line 49 with line 24 and reservoir 18. The communication of first accumulator 20 by first apply and release valve 40 with second apply valve 50 permits, via the at-rest or neutral position 51, first accumulator 20 to communicate fluid pressure to apply hydraulic lines 26, 55 and hydraulic apparatuses 61, 71 so that brakes 60, 70 experience a hydraulically actuated parking application. Fluid exiting hydraulic application/release apparatuses 61, 71 is transmitted through lines 62, 72, 49 and 24 to reservoir 18. When brakes 60, 70 and first accumulator 20 are in balance, fluid flow ceases at pressure $P_2$, which may correspond to approximately 970 psi as shown by curve portion $A_1$ of curve 5 in FIG. 1. At the appropriate time, second apply valve 50 is sequentially actuated and effects the apply position 52 whereby accumulator 20 is connected via lines 23 and 26 with termination 59 and second accumulator 30 communicated via lines 33 and 55 with the hydraulic application/release apparatuses 61, 71. This allows the high pressure fluid at the initial pressure in accumulator 30 to be applied to brakes 60, 70. Because the brakes are already under the initial pressure $P_2$, a further increase in braking load is effected until a hydraulic pressure/braking load balance is reached between the brakes and second accumulator 30. A final pressure $P_3$ is achieved and may correspond to approximately 1500 psi as illustrated by the top part of curved portion $A_2$ of curve 5. This corresponds to the braking load of approximately 1675 pounds effected by curve 6 in FIG. 1. Before or after second apply valve 50 is actuated, apply and release valve 40 is deactivated so that neutral valve position 43 returns to the position illustrated in FIG. 2 and lines 26 and 24 return to atmospheric pressure. Line 26 still remains isolated from the accumulators 20, 30 by means of its connection within termination 59 in the apply position 52 of apply valve 50. When the new balance at the second or additional (or final) phase of the hydraulic parking brake application is achieved, second apply valve 50 is deactivated and returns to at-rest or neutral position 51 which then effects a complete relief of pressure from the parking system. Neutral position 51 connects apply hydraulic lines 26, 55, first apply and release valve 40, line 24, and reservoir 18. The parking load within brakes 60, 70 is maintained via mechanical means. Optionally, the operation of apply valve 50 may be controlled by an external sensor such as a height, load, or grade sensing mechanism which will call for the additional parking force only when the need exists.

To effect a hydraulic release of hydraulically powered brakes 60, 70, apply and release valve 40 is activated to displace into position release position 42. This connects hydraulic apparatuses 61, 71, lines 63, 73, 55, apply valve 50, line 26, and line 24 with reservoir 18. Pressurized Fluid available in first accumulator 20 is transmitted via lines 23, 49, 62 and 72 to hydraulic apparatuses 61, 71 to effect complete releases of the brakes 60, 70. Thus, second apply valve 50 does not require energization during the release application cycle.

Apply and release valve 40 includes transitional positions 41A and 42A. Transitional position 41A is moved into place during an application of parking brake system 10 so that line 26 is disconnected briefly from communication with line 24 and reservoir 18, and before first accumulator 20 is connected via line 23 with line 26. Release transitional position 42A effects an intermittent disconnection of release line 49 with line 24 that communicates with reservoir 18 and a connection of line 26 with line 24 and reservoir 18 so that a return flow passage is in effect prior to moving into effect release position 42 which connects the first accumulator 20 and line 23 with release lines 49, 62 and 72.

The hydraulic actuation system of the present invention provides substantial advantages over prior systems. The system is able to deliver a higher final delivered pressure to the brakes and achieve higher final braking loads with the displacement of the same amount of fluid as required for a single accumulator hydraulic actuation system. The half-volume accumulators 20 and 30 are reduced in size and yet are able to deliver the necessary braking loads. Because of the size reductions, there is a lower cost effected by the dual accumulator system. Additionally, the system has the inherent ability to provide a two level system which may be incorporated with height sensing, load sensing, and grade sensing systems. Finally, the brake components of the system may experience longer useful lives when height, load or grade sensing systems are employed.

I claim:

1. An actuation system for a hydraulically powered parking brake mechanism, the system comprising pump means having an inlet connected with reservoir means and an outlet for supplying fluid pressure to at least two pressure storage means, the two pressure storage means comprising first pressure storage means communicating with first apply and release valve means and second pressure storage means communicating with second apply valve means, the first apply and release valve means communicating with the second apply valve means, and at least one brake mechanism which is actuated hydraulically to effect a parking application, the brake mechanism connected with the apply and release valve means and with the apply valve means to effect said parking application, such that operation of the pump means effects the supply of fluid pressure to said first and second pressure storage means and, independently, an actuation of the first apply and release valve means communicates the first pressure storage means with the second apply valve means and brake mechanism to effect an initial phase of said parking application, and activation of the second apply valve means disconnects the first pressure storage means from communication with the brake mechanism and connects the second pressure storage means with the brake mechanism to effect a second phase of said parking application.

2. The system in accordance with claim 1, wherein the pump means communicates with each of said pressure storage means via respective check valve means to effect isolation of the first and second pressure storage means from one another.

3. The system in accordance with claim 1, wherein the first apply and release valve means comprises a three-position valve having an intermediate at-rest position which connects apply and release hydraulic lines of the brake mechanism with the reservoir means.

4. The system in accordance with claim 3, wherein the second apply valve means comprises a two-position valve which in an at-rest position connects the apply hydraulic line with the brake mechanism.

5. The system in accordance with claim 3, wherein said first apply and release valve means includes an apply position which connects the first pressure storage means with the second apply valve means and the release hydraulic line with the reservoir means.

6. The system in accordance with claim 5, wherein the first apply and release valve means includes a release position which connects the second apply valve means with the reservoir means and connects the first pressure storage means with the release hydraulic line.

7. The system in accordance with claim 1, wherein the communication of the second pressure storage means with the second apply valve means includes check valve means preventing fluid flow from said second apply valve means toward said second pressure storage means.

8. The system in accordance with claim 1, wherein the first apply and release valve means and the second apply valve means comprise electrically operated valves.

9. The system in accordance with claim 8, wherein the connection of the second pressure storage means with the brake mechanism via the second apply valve means effects an additional phase of applying the brake mechanism.

10. The system in accordance with claim 1, wherein the first apply and release valve means includes a release position and transitional positions.

11. A method of actuating a hydraulically powered parking brake system, the system including pump means which communicates with first and second pressure storage means isolated hydraulically from one another, first apply and release valve means which communicates with the first pressure storage means and with a reservoir, second apply valve means which communicates with said first apply and release valve means, said second pressure storage means, and at least one brake mechanism which is hydraulically actuated to effect a parking application, the brake mechanism communicating with the first apply and release valve means, comprising the steps of activating at a predetermined pressure level said pump means to supply fluid pressure to said first and second pressure storage means, activating said first apply and release valve means to communicate said first pressure storage means with said second apply valve means and brake mechanism and to effect an initial phase of the parking application, and activating the second apply valve means to terminate the communication of the first pressure storage means with the brake mechanism and connect said second pressure storage means with the brake mechanism to effect a second phase of the parking application.

12. The method in accordance with claim 11, further comprising the step of deactivating the second apply valve means to terminate the parking application and activating said first apply and release valve means to a release position during a release application of the system so that said second apply valve means and brake mechanism are connected with the reservoir and a release line is communicated with the first pressure storage means.

13. The method in accordance with claim 12, further comprising the step of effecting a transition position of said first apply and release valve means during both the parking application and release application of the system.

14. The method in accordance with claim 13, wherein the transition position effected for the parking application comprises the step of disconnecting a second apply valve means communication with the reservoir and communicating a release line with the reservoir.

15. The method in accordance with claim 13, wherein the transition position effected for the release application comprises the step of disconnecting a release line communication with the reservoir and communicating the second apply valve means with the reservoir.

16. The method in accordance with claim 11, wherein operation of the first apply and release valve means and second apply valve means is effected electronically.

* * * * *